(12) United States Patent
Estrada et al.

(10) Patent No.: US 9,128,828 B2
(45) Date of Patent: Sep. 8, 2015

(54) EXAM NOTIFICATION TIMER DEVICE

(75) Inventors: Jorge L. Estrada, Glendale, CA (US);
Henry K. Chen, La Puente, CA (US);
Ever Ynsfran, Los Angeles, CA (US)

(73) Assignee: GAUSS SPIRE LLC, La Puente, CA (US)

(*) Notice: Subject to any disclaimer, the term of this patent is extended or adjusted under 35 U.S.C. 154(b) by 556 days.

(21) Appl. No.: 13/461,788

(22) Filed: May 2, 2012

(65) Prior Publication Data

US 2013/0297663 A1 Nov. 7, 2013

(51) Int. Cl.
G04G 9/00 (2006.01)
G06F 15/02 (2006.01)

(52) U.S. Cl.
CPC .................................. *G06F 15/0266* (2013.01)

(58) Field of Classification Search
None
See application file for complete search history.

(56) References Cited

U.S. PATENT DOCUMENTS

| | | | |
|---|---|---|---|
| 2,517,368 A | 8/1950 | Wiseley |
| 4,093,944 A | 6/1978 | Muncheryan |
| 4,189,912 A | 2/1980 | Washizuka |
| 4,630,935 A | 12/1986 | Zettek |
| 4,821,247 A | 4/1989 | Grooms |
| 5,023,853 A | 6/1991 | Kawata et al. |
| 5,144,600 A | 9/1992 | Cheng |
| 5,282,181 A | 1/1994 | Entner et al. |
| 5,289,452 A | 2/1994 | Sakamoto et al. |
| 5,764,594 A | 6/1998 | Berman et al. |
| 5,861,797 A | 1/1999 | Becker |
| 5,867,105 A | 2/1999 | Hajel |
| 6,173,060 B1 | 1/2001 | Huang |
| 6,687,720 B1 | 2/2004 | Colver et al. |
| 6,975,563 B2 | 12/2005 | de Brito |
| 2003/0117272 A1 | 6/2003 | Fegley et al. |
| 2004/0008589 A1 | 1/2004 | McMillan |
| 2007/0216537 A1 | 9/2007 | Park |

OTHER PUBLICATIONS

International Search Report in counterpart PCT application No. PCT/US2013/039148, dated Apr. 4, 2014.
Written Opinion in counterpart PCT application No. PCT/US2013/039148, dated Apr. 4, 2014.
"Examinator", http://www.examinator.com/, de Brito Corporation, 8 pages, printed from the Internet on May 14, 2012.
"Silent Timer", Silent Technology LLC, http://www.silenttimer.com/testhome/lsat_test.php, 18 pages, printed from the Internet on May 14, 2012.

*Primary Examiner* — Michael D Yaary
(74) *Attorney, Agent, or Firm* — Chen Yoshimura LLP

(57) ABSTRACT

A calculator and exam notification timer device integrated into one housing. A plurality of numeral keys (0-9) and function keys and a display are disposed the housing. A first processing section performs calculation functions based on input from the numeral keys and the function keys and displays the result on the display. A second processing section performs a time keeping function based on values programmed by user via the numeral keys and function keys, and displays a total elapsed or remaining time, a current exam problem, and an elapsed or remaining time for the current exam problem on the display. A switch within the calculator forwards the signal from the numeral keys to either the first or second processing section based on a switching state which is controlled by a switch key on the housing or one of the function keys.

18 Claims, 4 Drawing Sheets

US 9,128,828 B2

EXAM NOTIFICATION TIMER DEVICE

BACKGROUND OF THE INVENTION

1. Field of the Invention

The present invention is in the technical field of electronic timer device. More particularly, the present invention relates to an electronic timer device integrated with a calculator useful as an exam notification timer.

2. Description of the Related Art

U.S. Pat. No. 6,975,563 describes a "multimode electronic timepiece for assisting a person to take a multiple question timed examination. The number of questions and test time are entered into the timepiece along with selected alert points. A test timer mode then displays time remaining in the examination along with the corresponding question number, and a silent vibrating alarm alerts the person at the preselected alert points, and displays appropriate informative and encouraging messages." (Abstract.) The device uses a number of push buttons S1 to S4 to program the timer (see FIGS. 1, 2, 4).

U.S. patent application No. 2004/0008589 discloses method and apparatus "for timing events and sub-events. A timer allows a user to time the duration of an event. During the event, sub-events may also be timed, by use of a sub-event trigger (e.g., a sub-event button). A display can display information relating to the timed event and sub-event. For example, the timer may display the time elapsed or time remaining in the event, the number of past sub-events, the number of remaining sub-events, and/or statistical information relating to the timed event and sub-events. One application of the timer is as an aid to a person practicing for, or taking, a standardized test." (Abstract.) The device uses 0-9 buttons and other buttons to program the timer (see FIGS. 3 and [0032]), and can generate visual alerts at various points of the event of sub-event (see [0045]).

SUMMARY OF THE INVENTION

The present invention is directed to a calculator incorporating exam notification timer functions, where the timer functions are programmed using the same numeral keys that perform the calculation functions.

An object of the present invention is to provide an exam notification timer integrated into a calculator for aiding exam taker during exams.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a calculator having a timer function, which includes: a housing; a display disposed on the housing; a plurality of function keys disposed on the housing; a plurality of numeral keys disposed on the housing; a first processing section disposed in the housing for performing calculation functions; a second processing section disposed in the housing for performing timer programming and time keeping functions; and a switching section coupled to the first and second processing sections and coupled to at least the numeral keys, the switching section having a first switching state in which it forwards signals from the numeral keys to the first processing section and a second switching state in which it forwards signals from the numeral keys to the second processing section; wherein the first processing section receives signals from the numeral keys via the switching section, receives signals from at least some of the function keys, generates calculation results based on the received signals, and displays calculation results on the display; and wherein the second processing section receives signals from the numeral keys via the switching section, receives signals from at least some of the function keys, sets a time interval for each event based on the received signals, keeps track of a total elapsed or remaining time, a current event number, and an elapsed or remaining time of a current event based on a clock signal and the time interval value, and displays them on the display.

In another aspect, the present invention provides a method implemented in a calculator having a timer function, which includes: setting a switching state of a switching section to a first switching state or a second switching state; the switching section receiving a signal from a numeral key, and forwarding the signal to a first processing section when the switching section is in the first switching state and forwarding the signal to a second processing section when the switching section is in the second switching state; the first processing section receiving the signal from the switching section and receiving first additional signals from one or more function keys, generating a calculation result based on the received signals, and displaying the calculation result on a display; and the second processing section receiving the signal from the switching section and receiving second additional signals from one or more function keys, setting a time interval for each event based on the received signals, keeping track of a total elapsed or remaining time, a current event number, and an elapsed or remaining time of a current event based on a clock signal and the time interval value, and displaying them on the display.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1A:
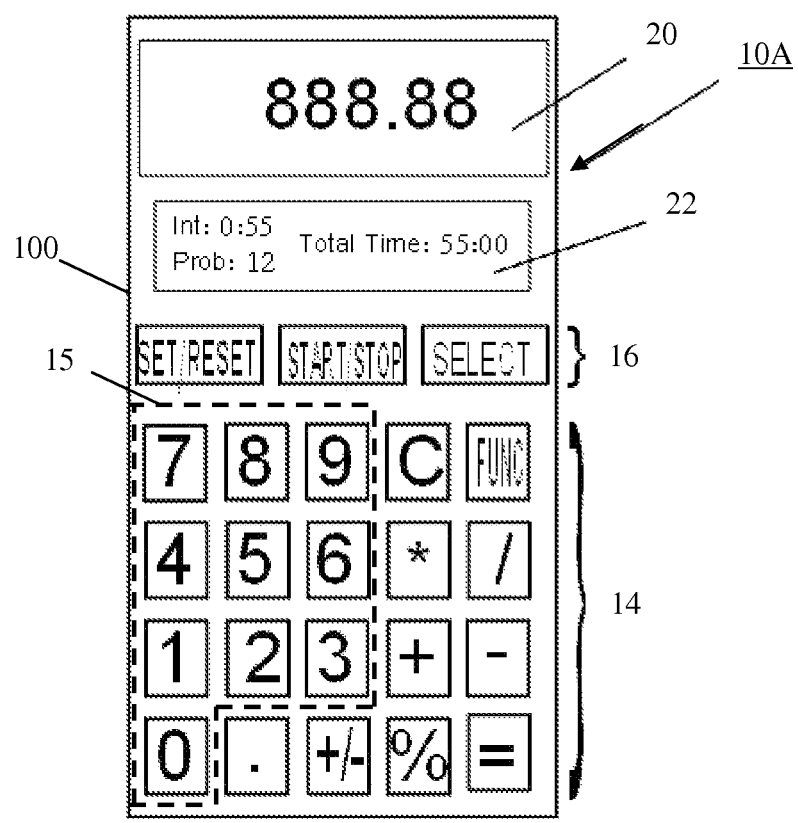
FIG. 1A illustrates a calculator incorporating an exam notification timer function according to a first embodiment of the present invention.
Figure 1B:
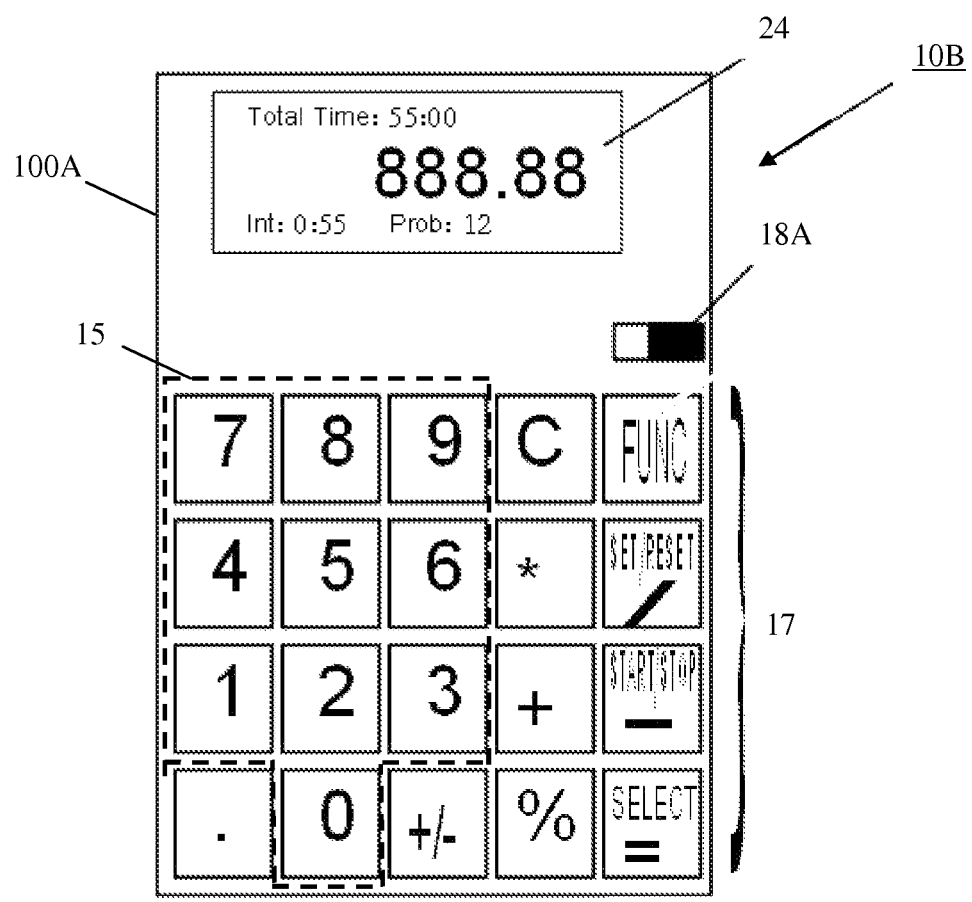
FIG. 1B illustrates a calculator incorporating an exam notification timer function according to a second embodiment of the present invention.
Figure 2A:
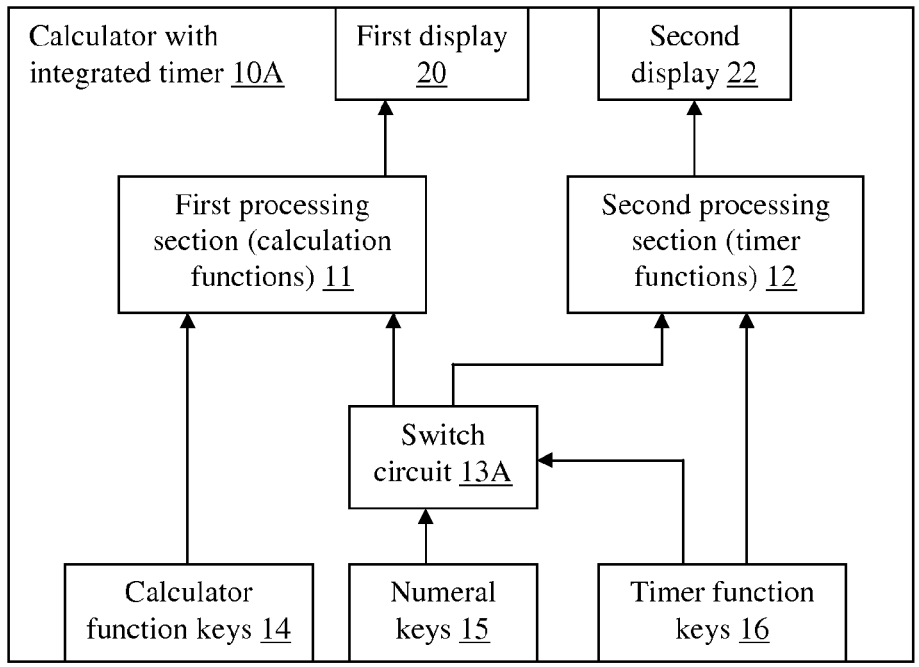
FIG. 2A is a block diagram illustrating a structure of the calculator of the first embodiment.
Figure 2B:
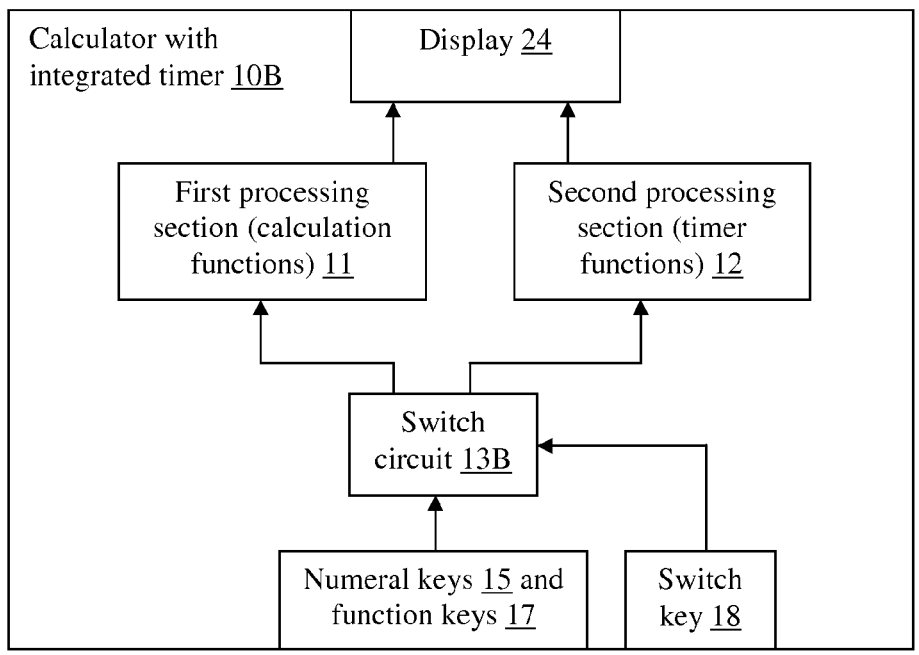
FIG. 2B is a block diagram illustrating a structure of the calculator of the second embodiment.

FIGS. 1A and 2A illustrate a calculator incorporating an exam notification timer function according to a first embodiment of the present invention. FIGS. 1B and 2B illustrate a calculator incorporating an exam notification timer function according to a second embodiment of the present invention. In each embodiment, the calculator has both the calculation functions of a conventional calculator and an integrated timer device that can keep track of various timings during an examination or a practice session, including the total elapsed or remaining time for the exam, the current exam problem that the exam taker should be working on, and the elapsed or remaining time of the current exam problem. The calculators of the two embodiments have different input key layout and corresponding differences in internal circuitry.

The calculator 10A of the first embodiment, shown in FIGS. 1A and 2A, has a first display window 20, a second display window 22, and a set of keys disposed on its housing 100. The set of keys include numeral keys (0 to 9 keys) 15, calculator function keys 14 such as keys for entering various mathematical operations, and timer function keys 16. Although not shown in the examples of FIG. 1A, the calculator function keys 14 may include keys for entering or programming more complex mathematical (including statistical) operations.

Information related to the calculation function, such as input and calculation results, is displayed in the first display window 20. The second display window 22, which is separate from the first display window 20, is used to display information related to the timer function, including the total elapsed or remaining time, the current exam problem, and the elapsed or remaining time of the current exam problem.

A first processing section 11 is provided in the calculator 10A to perform mathematical calculations and other functions of a conventional calculator. The calculator 10A further includes a second processing section 12 for controlling the timing functions as will be described in more detail later. Each processing section is implemented by suitable hardware which executes software or firmware stored in a memory of the calculator (not shown). The first and second processing sections 11 and 12 may be implemented by separate chips, or by one chip or one processor that perform both the calculation functions and the timing control functions. When one chip is used, the first and second processing sections 11 and 12 may be different software modules executed by the chip.

In the first embodiment, the timer function keys 16 are separate from the calculator function keys 14, and are provided for programming and operating the timer function. Various programming methods may be used. In one example, the user inputs the total time period of the exam and the number of exam problems. The second processing section 12 calculates the time interval allocated to each exam problem by dividing the total exam time by the number of exam problems. In another example, the user inputs the total exam time and the time interval allocated to each exam problem (the user may choose to enter a time interval for each exam problem such that the time interval multiplied by the number of exam problems is less than the total exam time). In another example, the user inputs the number of exam problems and the time interval allocated to each exam problem.

In the example illustrated in FIG. 1A, the timer function keys 16 include a SET/RESET key, a START/STOP key, and a SELECT key. In one example, programming of the timer function is performed as follows:

First, the user presses the SELECT key to select the value to be programmed. The SELECT key toggles between two or more values, including the total time for the exam, the number of exam problems, and the time interval for each exam problem, depending on the programming method described above. After selecting a value to program, the user presses the numeral keys to enter the desired value, such as 90 if the total time for the exam is 90 minutes, or 60 if the exam has 60 problems, or 90 if 90 seconds is allocated to each exam problem, etc. The user then presses the SET/RESET key to accept the value. The user may repeat these steps until all desired values are programmed. When the exam starts, the user may press the START key to start the timer's time keeping operation.

Although a specific example of the timer function keys is given above, other suitable designs for the timer function keys may be used. For example (not shown in the drawings), instead of the SELECT key and SET/RESET key, two or three function keys labeled "total exam time", "number of problems" and/or "time for each exam problem" may be provided for programming the respective values. For example, the user may press the "total exam time" key once, followed by the numeral keys, and then press the "total exam time" key again to accept the inputted value.

The programming is executed by the second processing section 12 based on the input from the timer function keys 16 and the numeral keys 15. The second processing section may also display relevant prompts and echo the inputted value on the display window 22 to assist the user during programming. Based on the parameter values inputted by the user, the second processing section 12 performs the timing function of the calculator 10A. It keeps track of the total elapsed time for the exam, the current exam problem, and the elapsed time or remaining time of the current exam problem, and displays and updates these values in the second display window 22.

Multiple counters may be used to implement the time keeping functions, including, for example, a total time counter representing the total elapsed or remaining time of an exam, an exam problem counter representing a current exam problem, and a time interval counter representing the elapsed or remaining time of the current exam problem. The initial or target value of the total time counter is set according to the total exam time programmed by the user; the initial or target value of the time internal counter is set by the time interval allocated to each exam problem either directly programmed by the user or calculated by the second processing section; the total time counter and the time interval counter are incremented or decremented using a clock signal. Each time the time interval passes, the exam problem counter is incremented by one and the time interval counter is reset to its initial value.

Figure 3A:
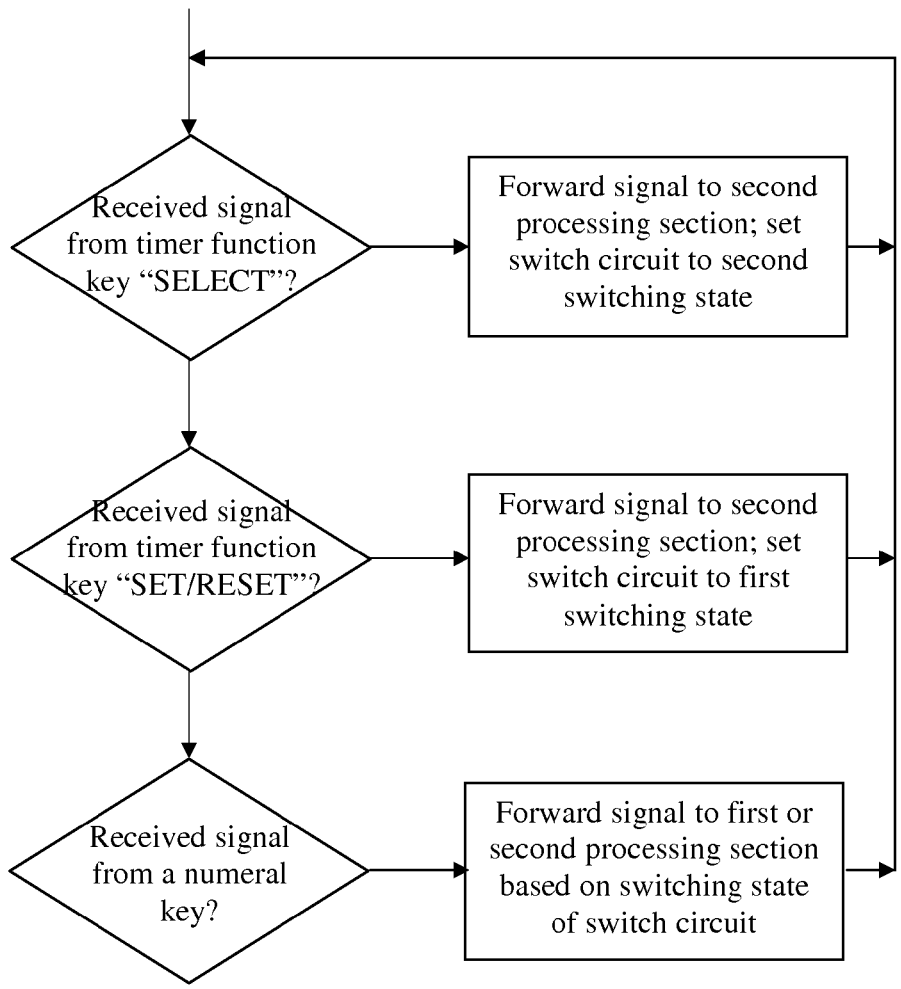
FIG. 3A schematically illustrates a method implemented in the calculator of the first embodiment.

As shown in FIG. 2A, the calculator function keys 14 provide input signals only to the first processing section (calculation functions) 11 but not to the second processing section (timer functions) 12, and the timer function keys 16 provide input signals only to the second processing section 12 but not to the first processing section. Because the numeral keys 15 are used for both the calculation functions and timer programming functions, the signals from the numeral keys 15 is coupled to a switch circuit 13A, which can selectively couple the signals to either the first processing section 11 or the second processing section 12 depending on its switching state. The switching state of the switch circuit 13A is controlled by signals from the timer function keys 16. For example, the switch circuit 13A may be designed such that when a signal from the SELECT key is received (which would indicate that the user intends to program a value of the timer), it is set to the second switching state and will forward subsequent signals from the numeral keys 15 to the second processing section 12; and when a signal from the SET/RESET key is received (which would indicate that the user has finished programming the value), it is set to the first switching state and will forward subsequent signals from the numeral keys 15 to the first processing section 11. This process carried out by the switching circuit 13A is summarized in FIG. 3A. Other suitable implementations are possible.

Alternatively or in addition, the switch circuit 13A may have a time out capability, so that after a predetermined time (e.g. 10 seconds) from the last signal received from the timer function keys 16, it switches the numeral keys 15 back to the first processing section 11. Alternatively or in addition, the switch circuit 13A may also be controlled by signals received from the calculator function keys 14 (not shown in FIG. 2A). For example, pressing the "=" key of the calculator function keys 14 may cause the switch circuit 13A to switch the numeral keys 15 to the first processing section 11. Any suitable logic design of the switch circuit 13A may be used, as long as its switching state is at least partly controlled by the signals from the timer function keys 16.

The calculator 10B of the second embodiment, shown in FIGS. 1B and 2B, are similar to the calculate 10A of the first embodiment in many respects; the description below focus on the parts that are different. The calculator 10B has a set of numeral keys 15 and a set of function keys 17 disposed on the housing 100B. Some of the function keys 17 are used for both the calculation functions and the timer programming and control functions. In the example illustrated in FIG. 1B, one key is label with both "/" and "SET/RESET", one key is label with both "−" and "START/STOP", and one key is label with both "=" and "SELECT", so that they can be used for either the labeled calculation functions or the labeled timer programming functions. A switch key 18 is provided on the housing 100B. When the switch key 18 is switched to a first state, the above described function keys perform the labeled calculation functions; when the switch key 18 is switched to a second state, they perform the labeled timer programming and control functions. The switch key 18 may be a mechanical key having two states, or a toggle switch.

Figure 3B:
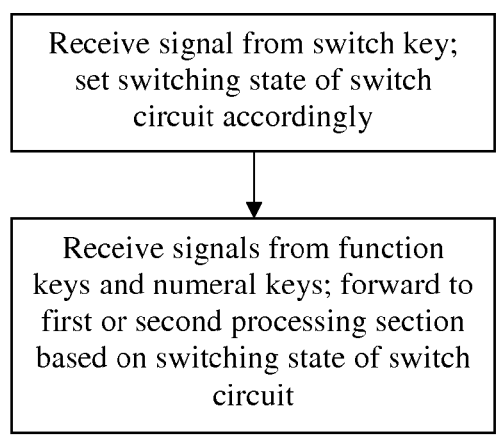
FIG. 3B schematically illustrates a method implemented in the calculator of the second embodiment.

As shown in FIG. 2B, the numeral keys 15 and function keys 17 (or at least the subset of the function keys that have dual functions, referred to as dual function keys) are coupled to a switch circuit 13B, which can selectively couple the signals to either the first processing section 11 or the second processing section 12 depending on its switching state. The switching state of the switch circuit 13B is controlled by the switch key 18. This process carried out by the switching circuit 13B is summarized in FIG. 3B.

In an alternative embodiment, one of the keys that serve a calculation function may be used to switch between the calculation function and the timer programming function. For example, the switching circuit 13B may be designed such that two signals from the "=" key in quick succession (e.g. within 1 second) will cause the switching circuit 13B to switch the input of the numeral keys 15 and function keys 17 to the second processing section 12. In such a case, the "=" key should be deemed the switch key, even though it also serves another function for the calculator.

Although not shown in FIG. 2B, some of the function keys 17 that perform only calculation functions may be coupled directly to the first processing section without going through the switch circuit 13B.

An alternative embodiment (not shown in the figures) may be designed by modifying the first embodiment. In this alternative embodiment, the calculator function keys 14 and timer function keys 16 are directly coupled to the first and second processing sections, respectively, and a separate switch key (similar to the switch key 18 in the second embodiment) is provided to switch the numeral keys 15 to either the first or second processing section via the switch circuit 13A.

A common feature of the first and second embodiments as well as the alternative embodiments described above is that the numeral keys 15 are used to program the timer function as well as performing their conventional function for the calculator. A switching circuit is provided to couple the input signals of the numeral keys 15 to either the first or second processing section.

As mentioned earlier, the first and second processing sections may be implemented by separate chips or a single chip or single processor. When one processor is used, the first and second processing sections 11 and 12 may be different software modules executed by the processor. In such a situation, the function of the switch circuit 13A and 13B may be performed by a logic switch (i.e. a part of the program) rather than a hardware switch. In other words, the signals from the mineral keys 15 are inputted to either the first software module or the second software module by the logic switch. The switch circuit or the logic switch may be generally referred to as a switching section.

In the second embodiment shown in FIGS. 1B and 2B, a single display window 24 is used to display both information related to the calculation functions and information related to the timer function. The displays related to the calculation function and the timer function may use two separate subareas of the display window 24. Alternatively (less preferred), the two displays may use the same area of the display window 24; for example, the display related to the timer function may temporarily disappear when the user uses the calculator to perform calculation functions. The second embodiment may also use two separate display windows as in the first embodiment shown in FIG. 1A; the first embodiment may use one display window as in the second embodiment shown in FIG. 1B.

The calculators 10A and 10B of the first and second embodiments may additional be provided with an alarm function, so that an alarm is given out every time the exam problem counter is updated to the next problem. This will remind the exam taker to move on to the next problem. The alarm may be in the form of audible alarms such as beeps, visible alarms such as flashes of the numbers displayed in the display window or flashes of a dedicated display icon or light, or tactile alarms such as vibration of the calculator, etc.

The calculator 10A and 10B may have a power saving feature by which the calculator portion of the circuitry and display window are automatically turned off when they are not used for a predetermined time period. The timer portion of the calculator 10A and 10B, such as the second processing section 12 and the display window 22 or part of the window 24 should remain on even when the calculation function of the calculator 10A and 10B is off.

As noted earlier, in one problem method, the user enters the number of problems in the exam and the total exam time (e.g. 30 problems, 60 minutes), and the second processing section 12 calculates the average time interval allocated to each exam problem by dividing the total exam time by the number of problems. The rounding of the division result should be handled carefully to reduce accumulation of rounding error. This may be achieved by using a clock having a sufficiently high frequency.

For example, while a 1 Hz clock may be used to update the displays (i.e., the displays of the total elapsed or remaining time, the current problem, and elapsed or remaining time of the current exam problem are updated every 1 second), a higher frequency clock (e.g. 10 Hz, 100 Hz, 1000 Hz, etc.) should be used for updating the problem counter and time interval counter. For example, if the total time for the exam is 1 hour and the number of problems is 55, the calculated time interval for each exam problem is 65.4545 . . . seconds; if this value is rounded to 65 seconds for each exam problem, there will be 15 second left at the end of the exam. Or, if the total time for the exam is 1 hour and the number of problems is 54, the calculated time interval for each exam problem is 66.6 . . . seconds; if this value is rounded to 67 seconds for each exam problem, the last exam problem will be 18 seconds short in time. Thus, it is preferable to use a higher frequency clock, e.g. 10 Hz, 100 Hz, 1000 Hz, etc., for updating the problem counter and time counter.

Although the timer functions are described above in the context of a timed exam, the timer has more general applications. Stated more generally, the timer function may be used to keep track of and display information useful for tracking events that are repeated at regular intervals. Thus, the current exam problem may be more generally referred to as the current event number and the related counter may be more generally referred to as the current event counter.

It will be apparent to those skilled in the art that various modification and variations can be made in the silent alarm and exam notification timer device and related method of the present invention without departing from the spirit or scope of the invention. Thus, it is intended that the present invention cover modifications and variations that come within the scope of the appended claims and their equivalents.

What is claimed is:

1. A calculator having a timer function, comprising:
    a housing;
    a display disposed on the housing;
    a plurality of function keys disposed on the housing;
    a plurality of numeral keys disposed on the housing;
    a first processing section disposed in the housing for performing calculation functions;
    a second processing section disposed in the housing for performing timer programming and time keeping functions; and
    a switching section coupled to the first and second processing sections and coupled to at least the numeral keys, the switching section having a first switching state in which it forwards signals from the numeral keys to the first processing section and a second switching state in which it forwards signals from the numeral keys to the second processing section;
    wherein the first processing section receives signals from the numeral keys via the switching section, receives signals from at least some of the function keys, generates calculation results based on the received signals, and displays calculation results on the display; and
    wherein the second processing section receives signals from the numeral keys via the switching section, receives signals from at least some of the function keys, sets a time interval for each event based on the received signals, keeps track of a total elapsed or remaining time, a current event number, and an elapsed or remaining time of a current event based on a clock signal and the time interval value, and displays them on the display.

2. The calculator of claim 1, wherein the plurality of function keys includes a plurality of calculator function keys directly coupled to the first processing section, and a plurality of timer function keys directly coupled to the second processing section.

3. The calculator of claim 2, wherein one or more of the plurality of timer function keys are coupled to the switching section for changing its switching state.

4. The calculator of claim 2, wherein one or more of the plurality of calculator function keys are coupled to the switching section for changing its switching state.

5. The calculator of claim 1, wherein the plurality of function keys includes a plurality of dual function keys coupled to the switching section, and wherein the switching section forwards signals from the dual function keys to the first processing section or to the second processing section when the switching section is in the first or second switching state, respectively.

6. The calculator of claim 1, further comprising a switch key coupled to the switching section for changing its switching state.

7. The calculator of claim 1, wherein the switching section is a switching circuit.

8. The calculator of claim 1, wherein the display includes a first display window coupled to the first processing section for displaying the calculation result generated by the first processing section, and a second display window coupled to the second processing section for displaying the total elapsed or remaining time, the current event number, and the elapsed or remaining time of a current event.

9. The calculator of claim 1, wherein the second processing section receives, from the function keys and the numeral keys, a value representing a total time period and a value representing a number of events being repeated, and calculates the time interval value for each event by dividing the total time period by the number of events.

10. The calculator of claim 1, wherein the total elapsed or remaining time and the elapsed or remaining time of the current event are incremented or decremented based on the clock signal, and each time the time interval passes, the current event number is incremented by one and the elapsed or remaining time of the current event is reset.

11. A method implemented in a calculator having a timer function, comprising:
    setting a switching state of a switching section to a first switching state or a second switching state;
    the switching section receiving a signal from a numeral key, and forwarding the signal to a first processing section when the switching section is in the first switching state and forwarding the signal to a second processing section when the switching section is in the second switching state;
    the first processing section receiving the signal from the switching section and receiving first additional signals from one or more function keys, generating a calculation result based on the received signals, and displaying the calculation result on a display; and
    the second processing section receiving the signal from the switching section and receiving second additional signals from one or more function keys, setting a time interval for each event based on the received signals, keeping track of a total elapsed or remaining time, a current event number, and an elapsed or remaining time of a current event based on a clock signal and the time interval value, and displaying them on the display.

12. The method of claim 11, wherein the first additional signals are received directly from one or more calculator function keys, the second additional signals are received directly from one or more timer function keys, wherein the calculator function keys and timer function keys are different keys.

13. The method of claim 12, wherein the switching state of the switching section is set based on signals received from one or more of the timer function keys.

14. The method of claim 12, wherein the switching state of the switching section is set based on signals received from one or more of the calculator function keys.

15. The method of claim 11, further comprising:
    the switching section receiving a signal from a dual function key and forwarding the signal to the first processing section when the switching section is in the first switching state and forwarding the signal to the second processing section when the switching section is in the second switching state.

16. The method of claim 11, wherein the switching state of the switching section is set based on a signal received from a switch key.

17. The method of claim 11, wherein the signals received by the second processing section represent a value representing a total time period and a value representing a number of events being repeated, and wherein the second processing section calculates the time interval value for each event by dividing the total time period by the number of events.

18. The method of claim 11, wherein the total elapsed or remaining time and the elapsed or remaining time of the current event are incremented or decremented based on the clock signal, and each time the time interval passes, the current event number is incremented by one and the elapsed or remaining time of the current event is reset.

* * * * *